United States Patent
Han et al.

(10) Patent No.: US 9,450,495 B2
(45) Date of Patent: Sep. 20, 2016

(54) SINGLE STAGE FORWARD-FLYBACK CONVERTER AND POWER SUPPLY APPARATUS FOR LIGHT EMITTING DIODE

(71) Applicant: SAMSUNG ELECTRO-MECHANICS CO., LTD., Suwon, Gyunggi-do (KR)

(72) Inventors: Sang Kyoo Han, Daejeon (KR);
Byoung Woo Ryu, Gyunggi-do (KR);
Heung Gyoon Choi, Gyunggi-do (KR);
Keun Wook Lee, Gyunggi-do (KR);
Hong Sun Park, Gyunggi-do (KR)

(73) Assignee: SOLUM CO., LTD, Suwon-Si, Gyeonggi-Do (KR)

( * ) Notice: Subject to any disclaimer, the term of this patent is extended or adjusted under 35 U.S.C. 154(b) by 328 days.

(21) Appl. No.: 13/929,382

(22) Filed: Jun. 27, 2013

(65) Prior Publication Data
US 2014/0184093 A1    Jul. 3, 2014

(30) Foreign Application Priority Data
Dec. 28, 2012    (KR) .................. 10-2012-0157057

(51) Int. Cl.
*H02M 3/33*    (2006.01)
*H02M 3/335*   (2006.01)
*H05B 33/08*   (2006.01)
*H02M 1/42*    (2007.01)
*H02M 1/00*    (2006.01)

(52) U.S. Cl.
CPC ....... *H02M 3/33546* (2013.01); *H02M 1/4258* (2013.01); *H05B 33/0815* (2013.01); *H02M 2001/0022* (2013.01); *Y02B 20/346* (2013.01); *Y02B 70/126* (2013.01)

(58) Field of Classification Search
CPC ................................. H02M 3/33546
USPC ................................. 315/291, 297
See application file for complete search history.

(56) References Cited

U.S. PATENT DOCUMENTS

| 6,191,960 B1 * | 2/2001 | Fraidlin et al. ............. 363/25 |
| 7,924,579 B2 * | 4/2011 | Arduini ............ H02M 3/335 363/21.06 |
| 2009/0122579 A1 | 5/2009 | Senaj |

(Continued)

FOREIGN PATENT DOCUMENTS

KR    2012-0031215 A    3/2012

OTHER PUBLICATIONS

Notice of Office Action Korean Patent Application No. 10-2012-0157057dated Nov. 29, 2013 with English translation.

(Continued)

*Primary Examiner* — John Poos
(74) *Attorney, Agent, or Firm* — McDermott Will & Emery LLP (57) ABSTRACT

There is provided a single stage forward-flyback converter including a power converting unit switching input power to perform a forward power conversion operation while being switched on and perform a flyback power conversion operation while being switched off, a path providing unit clamping power formed by the forward power conversion operation of the power converting unit and power formed by the flyback power conversion operation thereof to provide power transfer paths, and a controlling unit controlling the power conversion operation of the power converting unit according to a voltage level of the input power.

16 Claims, 6 Drawing Sheets

(56) References Cited

U.S. PATENT DOCUMENTS

2009/0196075 A1    8/2009  Arduini
2010/0067259 A1    3/2010  Liu
2011/0309760 A1*  12/2011  Beland ............... H02M 1/4258
                                                             315/201

OTHER PUBLICATIONS

Hernan Emilio Tacca, "Power Factor Correction Using Merged Flyback-Forward Converters", IEEE Transactions on Power Electronics, vol. 15, No. 4, Jul. 2000, pp. 585-594.

* cited by examiner

SINGLE STAGE FORWARD-FLYBACK CONVERTER AND POWER SUPPLY APPARATUS FOR LIGHT EMITTING DIODE

CROSS-REFERENCE TO RELATED APPLICATIONS

This application claims the priority of Korean Patent Application No. 10-2012-0157057 filed on Dec. 28, 2012, in the Korean Intellectual Property Office, the disclosure of which is incorporated herein by reference.

BACKGROUND OF THE INVENTION

1. Field of the Invention

The present invention relates to a single stage forward-flyback converter and a power supply apparatus for a light emitting diode.

2. Description of the Related Art

In general, in order to drive an electronic device in a domestic, commercial or industrial setting, a power supply apparatus converting commercial power into driving power appropriate for the electronic device and supplying the converted driving power has been adopted in the interior or on an outer portion of the electronic device.

The power supply apparatus may also be adopted in order to drive a light emitting diode.

Recently, interest in and demand for light emitting diodes (LEDs) has increased.

A device using the light emitting diode may be manufactured to be compact to thereby be used in a location in which it is difficult to install an existing electronic product. Further, in the case in which the light emitting diode is used as an illumination apparatus, it is easy to implement various colors of light and control illuminance, such that the light emitting diode may be used as a system illumination apparatus suitable in circumstances including watching a movie, reading books, and having a meeting.

In addition, the light emitting diode consumes an amount of power equal to about of the power consumed by an incandescent lamp, has a lifespan of fifty thousand to a hundred thousand hours, 5 to 10 times longer than that of an incandescent lamp, and is environmentally-friendly as a mercury free light source and may be variously designed.

Due to these characteristics, light emitting diode illumination projects have been promoted as government-backed national projects in a range of nations including America, Japan and Australia, as well as Korea.

As described above, the light emitting diode, the use of which has increased, requires a driving apparatus for the driving thereof. However, as described in the following Related Art Document, in the case of a two-stage configuration including a power factor correction circuit stage performing power factor correction, and a direct current (DC) to DC converter circuit stage for a constant current control of an output load, power conversion efficiency is deteriorated, and in the case of driving an array including a plurality of light emitting diodes, when a required light emitting diode driving voltage rises, manufacturing costs may be increased due to the use of a high voltage element.

RELATED ART DOCUMENT (Patent Document 1) Korean Patent Laid-open Publication No. 2012-0031215

SUMMARY OF THE INVENTION

An aspect of the present invention provides a single stage forward-flyback converter capable of improving a power factor and performing forward and flyback power conversion operations in a single power stage and performing forward and flyback power conversion operations regardless of an input power level, and a power supply apparatus for a light emitting diode.

According to an aspect of the present invention, there is provided a single stage forward-flyback converter, including: a power converting unit switching input power to perform a forward power conversion operation while being switched on and perform a flyback power conversion operation while being switched off; a path providing unit clamping power formed by the forward power conversion operation of the power converting unit and power formed by the flyback power conversion operation thereof to provide power transfer paths; and a controlling unit controlling the power conversion operation of the power converting unit according to a voltage level of the input power.

The controlling unit may detect the voltage level of the input power and control a switching on operation of the power converting unit when the detected voltage has a level of zero, to improve a power factor.

The power converting unit may include: a power switch switching the input power; and a single transformer having a primary winding receiving the power switched by the power switch and a secondary winding electromagnetically coupled to the primary winding to receive power induced from the primary winding.

The path providing unit may include: a balance capacitor maintaining balance in power levels between the power formed by the forward power conversion operation of the power converting unit and the power formed by the flyback power conversion operation thereof; a diode group providing the respective power transfer paths for the power formed by the forward power conversion operation of the power converting unit and the power formed by the flyback power conversion operation thereof; and a stabilization unit including first and second output inductors and an output capacitor to stabilize the power transferred via the power transfer path.

The power switch may maintain a constant turn-on duty to improve a power factor of the input power.

The input power may be rectified and transferred to the power converting unit.

The diode group may include: a first diode having an anode connected to one terminal of the second output inductor of the stabilization unit and a cathode connected to one terminal of the first output inductor of the stabilization unit to provide the power transfer path; and a second diode having an anode connected to the other terminal of the second output inductor of the stabilization unit and a cathode connected to one terminal of the balance capacitor and the other terminal of the first output inductor to provide the power transfer path.

An output of the power converting unit may be supplied to at least one light emitting diode.

According to another aspect of the present invention, there is provided a power supply apparatus for alight emitting diode, including: a power converting unit switching input power to perform a forward power conversion operation while being switched on and perform a flyback power conversion operation while being switched off; a path providing unit clamping power formed by the forward power conversion operation of the power converting unit and power formed by the flyback power conversion operation thereof to provide power transfer paths and supplying the power to at least one light emitting diode; and a controlling unit controlling the power conversion operation of the power converting unit according to a voltage level of the input power, detecting the voltage level of the input power, and controlling a switching on operation of the power converting unit when the detected voltage has a level of zero, to improve a power factor.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1:
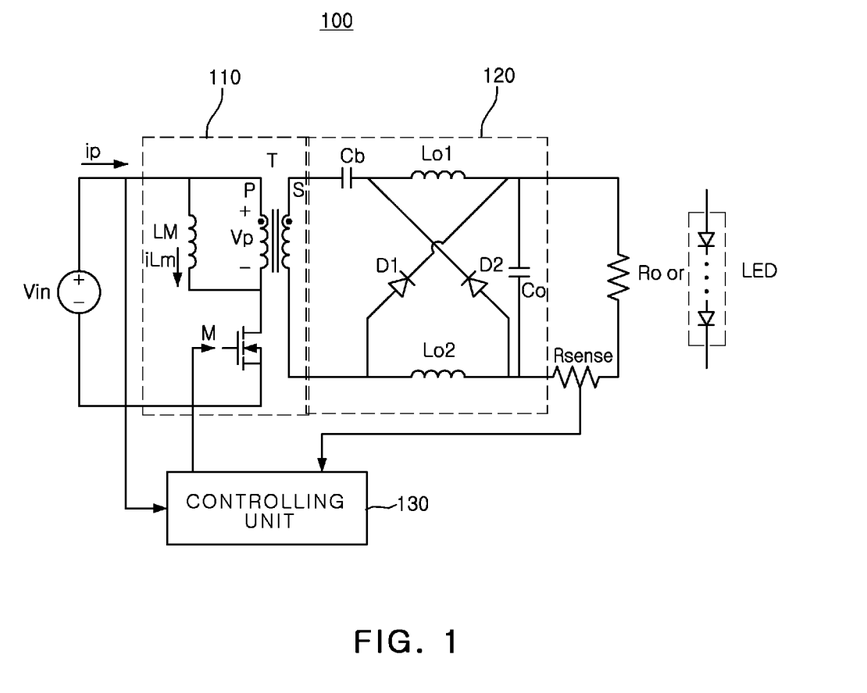
FIG. 1 is a schematic circuit diagram of a single stage forward-flyback converter or a power supply apparatus for a light emitting diode according to an embodiment of the present invention.

Referring to FIG. 1, a single stage forward-flyback converter 100 according to an embodiment of the present invention may include a power converting unit 110, a path providing unit 120, and a controlling unit 130.

The power converting unit 110 may include a transformer T having a primary winding P and a secondary winding S and a power switch M switching power input to the primary winding P. The primary winding P and the secondary winding S may be electromagnetically coupled to each other so as to have a preset turns ratio, the power input to the primary winding P may induce power to be supplied to the secondary winding S, according to the switching of the power switch M, and a voltage level of the power induced to the secondary winding S may be determined according to the turns ratio.

In addition, the power converting unit 110 may perform a forward power conversion operation and a flyback power conversion operation and the controlling unit 130 may control the power switching of the power switch M of the power converting unit 110 according to the input power.

Power output from the power converting unit 110 may be transferred to a load Ro, in particular, to at least one light emitting diode (LED) to allow the LED to emit light. A plurality of LEDs may be connected to each other in series to configure one LED array. Although not illustrated, a plurality of LED arrays may be connected to each other in parallel and receive the output power to emit light.

The path providing unit 120 may include a balance capacitor Cb, a diode group consisting of diodes D1 and D2, and a stabilization unit including a first output inductor Lo1, a second output inductor Lo2, and an output capacitor Co.

The balance capacitor Cb may maintain balance in power levels between power formed by the forward power conversion operation of the power converting unit 110 and power formed by the flyback power conversion operation thereof and may be electrically connected between the first output inductor Lo1 and the secondary winding S.

The diode group consisting of diodes D1 and D2 may clamp the power formed by the forward power conversion operation of the power converting unit 110 and the power formed by the forward power conversion operation of the power converting unit 110 to provide power transfer paths, and may include a first diode D1 having an anode connected to one terminal of the second output inductor Lo2 and a cathode connected to one terminal of the first output inductor Lo1 to provide the power transfer path and a second diode D2 having an anode connected to the other terminal of the second output inductor Lo2 and a cathode connected to one terminal of the balance capacitor Cb and the other terminal of the first output inductor Lo1 to provide the power transfer path.

The stabilization unit may include the first and second output inductors Lo1 and Lo2 and the output capacitor Co, the first output inductor Lo1 may be connected between the cathodes of the first and second diodes D1 and D2, the second output inductor Lo2 may be connected between the anodes of the first and second diodes D1 and D2, the output capacitor Co may be connected between one terminal of the first output inductor Lo1 and the other terminal of the second output inductor Lo2, and the first and second output inductors Lo1 and Lo2 and the output capacitor Co may serve as an LC filter to stabilize the power transferred via the power transfer path.

The power converting unit 110 may perform the forward power conversion operation and the flyback power conversion operation regardless of a voltage level of the input power.

In addition, the power converting unit 110 may share the power switch M during the forward power conversion operation and the flyback power conversion operation, and the power switch M may maintain a constant turn-on duty according to a control of the controlling unit 130 to improve the power factor of the input power.

That is, the power converting unit 110 may improve the power factor and perform the forward and flyback power conversion operations in a single power conversion circuit.

Hereinafter, the power conversion operation of the power converting unit 110 will be described in detail.

Figure 2:
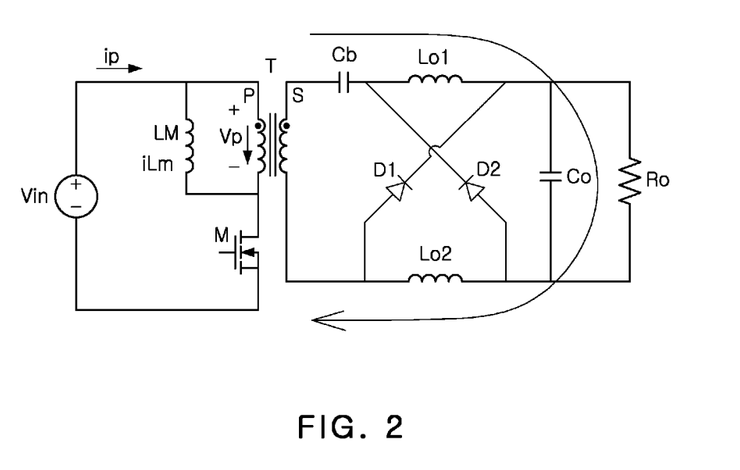
FIGS. 2 and 3 are schematic circuit diagrams respectively illustrating a current flow while the single stage forward-flyback converter is switched on and off, according to the embodiment of the present invention.
Figure 3:
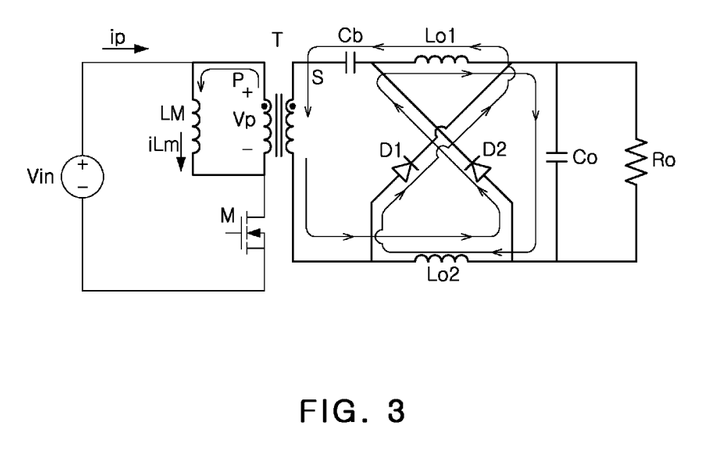
Figure 4:
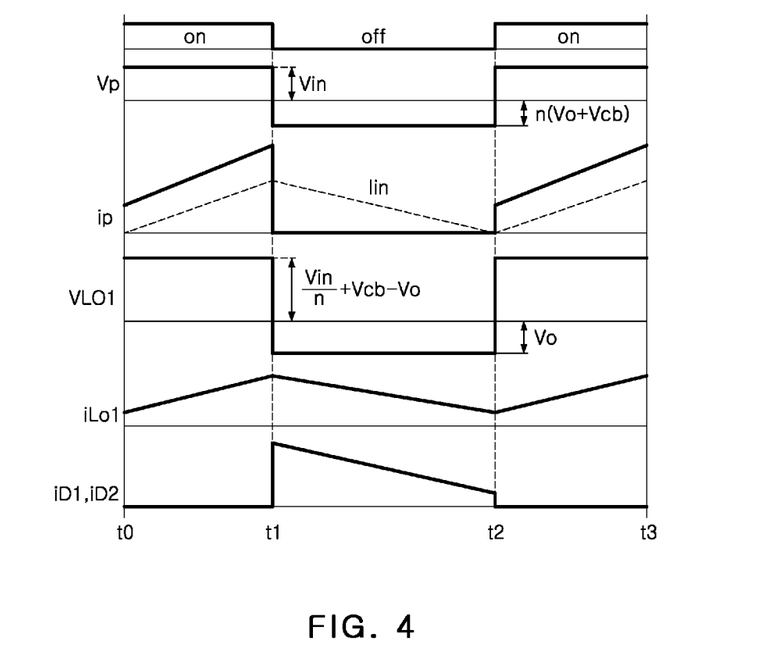
FIG. 4 is a graph illustrating signal waveforms of main components while the single stage forward-flyback converter is switched on and off, according to the embodiment of the present invention.

FIGS. 2 and 3 are schematic circuit diagrams respectively illustrating a current flow while the single stage forward-flyback converter is switched on and off, according to the embodiment of the present invention and FIG. 4 is a graph illustrating signal waveforms of main components while the single stage forward-flyback converter is switched on and off, according to the embodiment of the present invention.

Referring first to FIGS. 2 and 4, the single stage forward-flyback converter according to the embodiment of the present invention may perform a forward operation while being switched on, in mode 1, t0 through t1, to form a current flow as illustrated by an arrow and a thick solid line.

When the power switch M is turned on, a current path is formed in an arrow direction as illustrated and power may be transferred to the secondary side using a forward scheme. In this case, magnetic energy may be stored in a magnetizing inductor Lm of a primary side while the power switch is turned on. The first and second diodes D1 and D2 located at the secondary side may be turned off, the balance capacitor Cb may balance between the power transferred using the forward scheme while the power switch M is turned on and the power transferred using the flyback scheme while the power switch M is turned off to extend the voltage level of the input power capable of operating the forward scheme, whereby the forward operation may be performed regardless of the voltage level of the input power and highly-efficient power transmissions may be allowed.

When voltage across the balance capacitor Cb refers to Vcb, voltage stress across the first output inductor Lo1 may be represented by (Vin/n)+Vcb−Vo. Here, Vin may represent the voltage level of the input power and n may be the turns ratio of the transformer T.

Next, when the power switch Q is turned off, in mode2, t1 through t2, as illustrated in FIG. 3, the single stage forward-flyback converter according to the embodiment of the present invention performs the flyback power conversion operation while being switched off to transfer power in an arrow direction and a thick solid line direction. Referring to FIG. 3, energy stored in the magnetizing inductor Lm may transfer power through the power transfer path formed using the flyback scheme, and the first and second diodes D1 and D2 of the secondary side may be electrically conducted to form the power transfer path as illustrated.

Figure 5A:
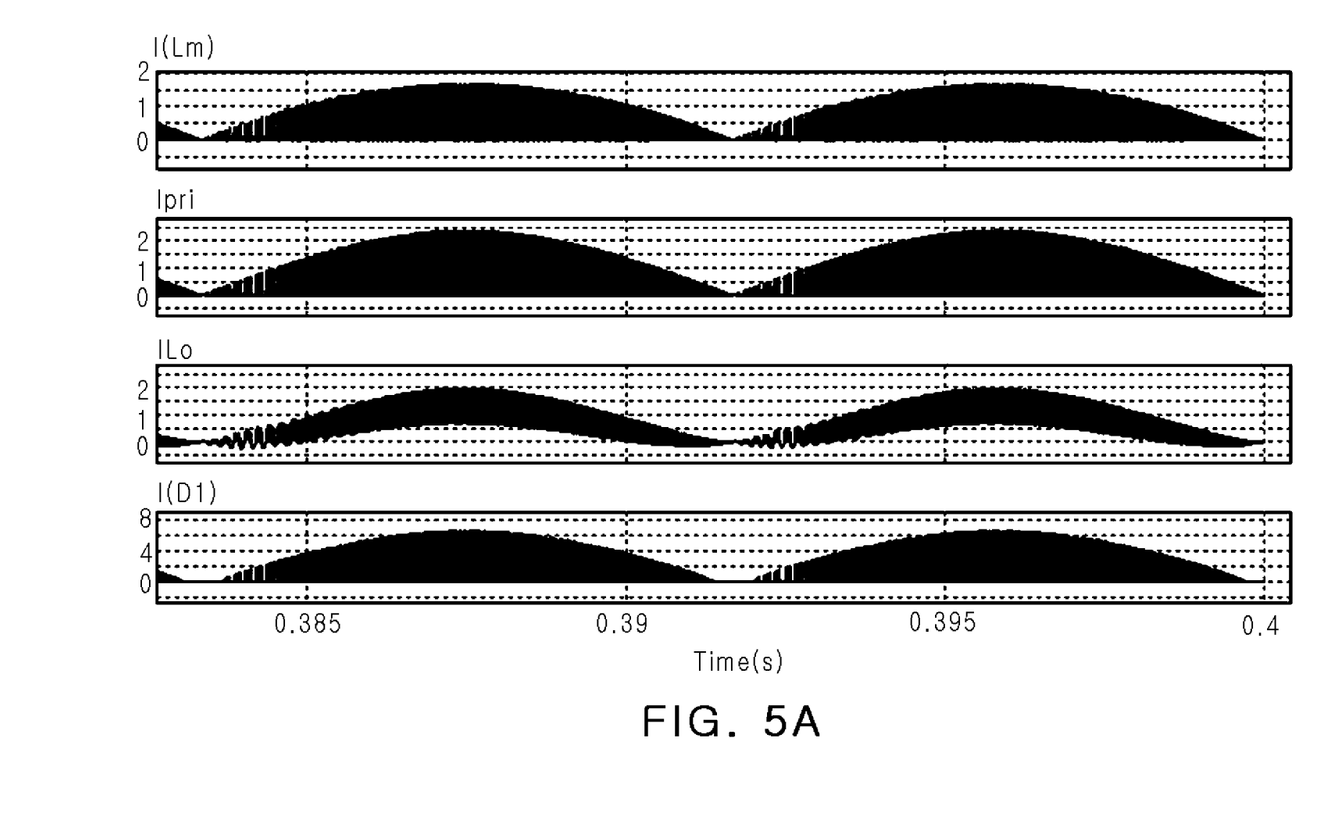
FIGS. 5A and 5B are graphs illustrating electrical characteristics of the single stage forward-flyback converter according to the embodiment of the present invention.
Figure 5B:
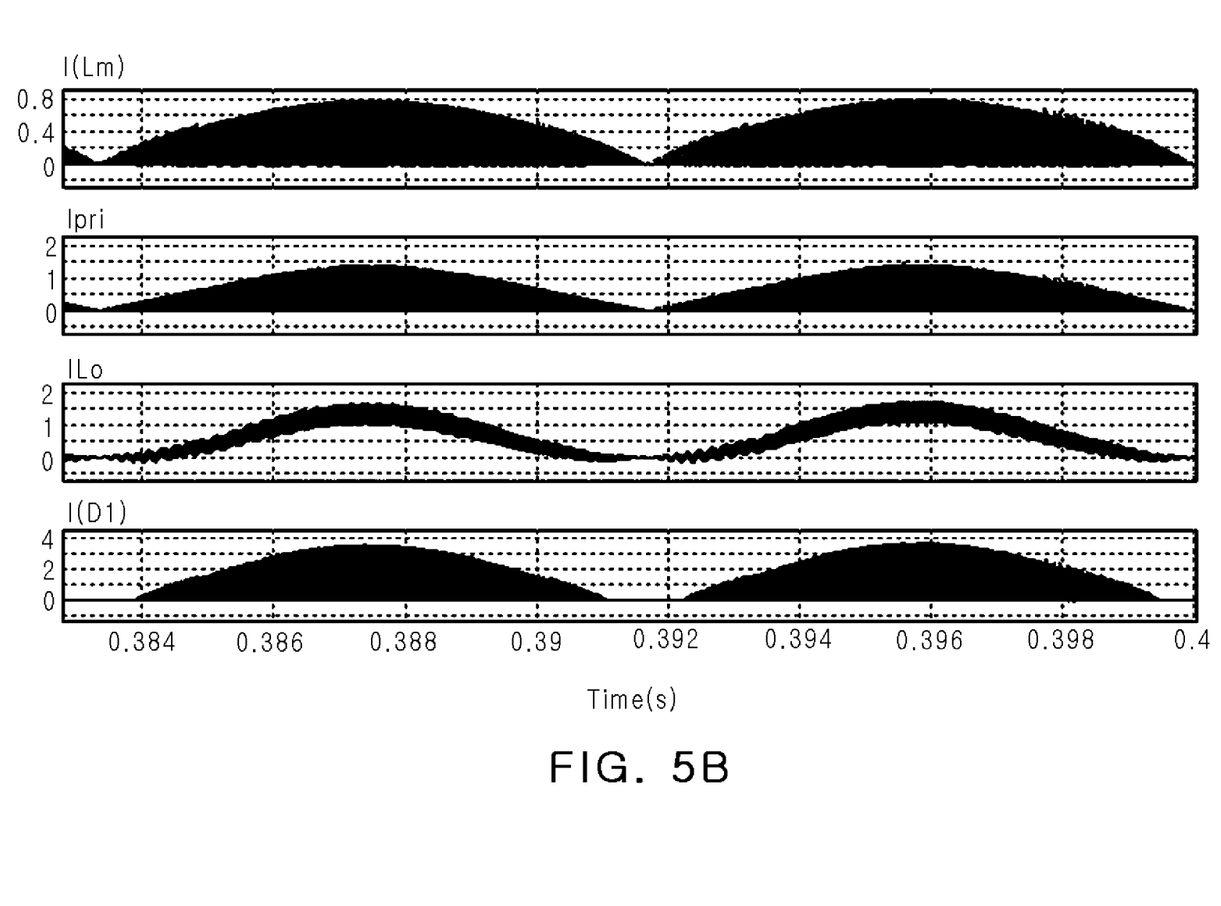

FIGS. 5A and 5B are graphs illustrating electrical characteristics of the single stage forward-flyback converter according to the embodiment of the present invention.

It can be appreciated from FIGS. 5A and 5B that the single stage forward-flyback converter according to the embodiment of the present invention exhibits a magnetizing current ILm of the transformer, a primary-side current Ipri of the transformer T, a first output inductor current ILo1, and a current ID1 of the first diode D1 when the voltage level of the input power is 90V (FIG. 5A) and 264V (FIG. 5B) and the input current follows a phase of the input voltage as illustrated in the waveform of the primary side current Ipri to acquire a high power factor. Meanwhile, it may be confirmed that the first output inductor current ILo1 flows continuously at all times depending on the charge balance principle of the balance capacitor Cb on the secondary side, and thus a forward converter operation may be performed regardless of the magnitude of the input voltage.

The single stage forward-flyback converter according to the embodiment of the present invention may remarkably reduce offsets in current of the magnetizing inductor of the transformer to significantly decrease core loss and regenerate the current in the magnetizing inductor on an output side during the forward operation to transfer power in all switching periods, thereby greatly improving efficiency and a power factor.

As set forth above, according to the embodiment of the present invention, a power factor may be improved and forward and flyback power conversion operations may be performed in a single power stage and the forward and flyback power conversion operations may be performed regardless of a level of an input power, thereby reducing manufacturing costs and a circuit area at the time of designing the power stage.

While the present invention has been shown and described in connection with the embodiments, it will be apparent to those skilled in the art that modifications and variations can be made without departing from the spirit and scope of the invention as defined by the appended claims.

What is claimed is:

1. A single stage forward-flyback converter, comprising:
a power converting unit switching input power to perform a forward power conversion operation while being switched on and perform a flyback power conversion operation while being switched off;
a path providing unit clamping power formed by the forward power conversion operation of the power converting unit and power formed by the flyback power conversion operation thereof to provide power transfer paths; and
a controlling unit controlling the power conversion operation of the power converting unit according to a voltage level of the input power,
wherein the input power is rectified and transferred to the power converting unit.

2. A single stage forward-flyback converter, comprising:
a power converting unit switching input power to perform a forward power conversion operation while being switched on and perform a flyback power conversion operation while being switched off;
a path providing unit clamping power formed by the forward power conversion operation of the power converting unit and power formed by the flyback power conversion operation thereof to provide power transfer paths; and
a controlling unit controlling the power conversion operation of the power converting unit according to a voltage level of the input power,
wherein the controlling unit detects the voltage level of the input power and controls a switching on operation of the power converting unit when the detected voltage has a level of zero, to improve a power factor.

3. The single stage forward-flyback converter of claim 1, wherein the power converting unit includes:
a power switch switching the input power; and
a single transformer having a primary winding receiving the power switched by the power switch and a secondary winding electromagnetically coupled to the primary winding to receive power induced from the primary winding.

4. The single stage forward-flyback converter of claim 1, wherein the path providing unit includes:
a balance capacitor maintaining balance in power levels between the power formed by the forward power conversion operation of the power converting unit and the power formed by the flyback power conversion operation thereof;
a diode group providing the respective power transfer paths for the power formed by the forward power conversion operation of the power converting unit and the power formed by the flyback power conversion operation thereof; and
a stabilization unit including first and second output inductors and an output capacitor to stabilize the power transferred via the power transfer path.

5. The single stage forward-flyback converter of claim 3, wherein the power switch maintains a constant turn-on duty to improve a power factor of the input power.

6. The single stage forward-flyback converter of claim 4, wherein the diode group includes:
a first diode having an anode connected to one terminal of the second output inductor of the stabilization unit and a cathode connected to one terminal of the first output inductor of the stabilization unit to provide the power transfer path; and a second diode having an anode connected to the other terminal of the second output inductor of the stabilization unit and a cathode connected to one terminal of the balance capacitor and the other terminal of the first output inductor to provide the power transfer path.

7. The single stage forward-flyback converter of claim 1, wherein an output of the power converting unit is supplied to at least one light emitting diode.

8. A power supply apparatus for a light emitting diode, comprising:
  a power converting unit switching input power to perform a forward power conversion operation while being switched on and perform a flyback power conversion operation while being switched off;
  a path providing unit clamping power formed by the forward power conversion operation of the power converting unit and power formed by the flyback power conversion operation thereof to provide power transfer paths and supplying the power to at least one light emitting diode; and
  a controlling unit controlling the power conversion operation of the power converting unit according to a voltage level of the input power, detecting the voltage level of the input power, and controlling a switching on operation of the power converting unit when the detected voltage has a level of zero, to improve a power factor, wherein the input power is rectified and transferred to the power converting unit.

9. The power supply apparatus of claim 8, wherein the power converting unit includes:
  a power switch switching the input power; and
  a single transformer having a primary winding receiving the power switched by the power switch and a secondary winding electromagnetically coupled to the primary winding to receive power induced from the primary winding.

10. The power supply apparatus of claim 8, wherein the path providing unit includes:
  a balance capacitor maintaining balance in power levels between the power formed by the forward power conversion operation of the power converting unit and the power formed by the flyback power conversion operation thereof;
  a diode group providing the respective power transfer paths for the power formed by the forward power conversion operation of the power converting unit and the power formed by the flyback power conversion operation thereof; and
  a stabilization unit including first and second output inductors and an output capacitor to stabilize the power transferred via the power transfer path.

11. The power supply apparatus of claim 10, wherein the power switch maintains a constant turn-on duty to improve the power factor of the input power.

12. The power supply apparatus of claim 10, wherein the diode group includes:
  a first diode having an anode connected to one terminal of the second output inductor of the stabilization unit and a cathode connected to one terminal of the first output inductor of the stabilization unit to provide the power transfer path; and
  a second diode having an anode connected to the other terminal of the second output inductor of the stabilization unit and a cathode connected to one terminal of the balance capacitor and the other terminal of the first output inductor to provide the power transfer path.

13. The single stage forward-flyback converter of claim 3, wherein the power converting unit further includes:
  a magnetizing inductor connected to the primary winding in parallel.

14. The single stage forward-flyback converter of claim 1, wherein the power converting unit includes a transformer having a primary winding and a secondary winding that each have only two terminals.

15. The power supply apparatus of claim 9, wherein the power converting unit further includes:
  a magnetizing inductor connected to the primary winding in parallel.

16. The power supply apparatus of claim 8, wherein the power converting unit includes a transformer having a primary winding and a secondary winding that each have only two terminals.

* * * * *